United States Patent
Oosterman

(12)
(10) Patent No.: US 6,749,128 B1
(45) Date of Patent: Jun. 15, 2004

(54) SPRAY CONTROL DEVICE

(75) Inventor: Michael Henry Aart Oosterman, Christchurch (NZ)

(73) Assignee: C-Dax Systems Limited, Palmerston (NZ)

( * ) Notice: Subject to any disclaimer, the term of this patent is extended or adjusted under 35 U.S.C. 154(b) by 185 days.

(21) Appl. No.: 09/980,461
(22) PCT Filed: Jun. 2, 2000
(86) PCT No.: PCT/NZ00/00088
§ 371 (c)(1), (2), (4) Date: Dec. 4, 2001
(87) PCT Pub. No.: WO00/74861
PCT Pub. Date: Dec. 14, 2000

(30) Foreign Application Priority Data

Jun. 4, 1999 (NZ) .............................................. 336103

(51) Int. Cl.⁷ .............................................. B67D 5/08
(52) U.S. Cl. .......................... 239/71; 239/155; 239/170
(58) Field of Search .................... 239/67–69, 71–74, 239/76, 155, 156, 170

(56) References Cited

U.S. PATENT DOCUMENTS

| | | | | |
|---|---|---|---|---|
| 3,782,634 A | * | 1/1974 | Herman ...................... 239/156 |
| 3,853,272 A | * | 12/1974 | Decker et al. ............... 239/155 |
| 3,877,645 A | * | 4/1975 | Oligschlaeger ............. 239/155 |
| 4,052,003 A | | 10/1977 | Steffen | |
| 4,350,293 A | | 9/1982 | Lestradet | |
| 4,392,611 A | * | 7/1983 | Bachman et al. .............. 239/74 |
| 4,553,702 A | * | 11/1985 | Coffee et al. ................ 239/690 |
| 4,630,773 A | * | 12/1986 | Ortlip ............................ 239/1 |
| 4,637,547 A | | 1/1987 | Hiniker et al. | |
| 4,803,626 A | * | 2/1989 | Bachman et al. .............. 701/50 |
| 4,813,604 A | * | 3/1989 | Curran, Jr. ................... 239/163 |
| 4,967,957 A | | 11/1990 | Bachman | |
| 5,097,861 A | * | 3/1992 | Hopkins et al. ........... 137/78.3 |
| 5,248,448 A | | 9/1993 | Waldron et al. | |
| 5,475,614 A | * | 12/1995 | Tofte et al. .................. 700/283 |
| 6,538,578 B1 | * | 3/2003 | Doherty ...................... 340/905 |

FOREIGN PATENT DOCUMENTS

EP 0 068 606 1/1983

* cited by examiner

Primary Examiner—Michael Mar
Assistant Examiner—Thach H Bui
(74) Attorney, Agent, or Firm—Young & Thompson

(57) ABSTRACT

A spray control device for use with vehicle mountable spraying apparatus having a pump for conveying fluid under pressure to a spray head. The control device has a pressure sensor for sensing the pressure of the fluid near the spray head. A speed sensor enables calculation of vehicle speed. An adjustment device adjusts the delivery of fluid to the spray head. A microprocessor is programmed to calculate from information derived from the pressure sensor and speed sensor spray application rate. The microprocessor compares the application rate with a stored target application rate to thereby cause the adjustment device to, if necessary, adjust the pump so that the pressure of fluid delivery achieves the target application rate.

21 Claims, 3 Drawing Sheets

SPRAY CONTROL DEVICE

BACKGROUND OF THE INVENTION

This invention relates to a control device for spraying which is primarily but not exclusively intended for use with vehicles such as an all terrain vehicle ("ATV"), small farm tractors, lawn tractors and the like.

It is known to provide a spray control system for ensuring that a correct spray application rate is maintained. Such a system will generally include a constant speed pump which pumps fluid to be sprayed from a holding tank to a spray boom having a series of spray nozzles. A valve means such as a butterfly valve or motor driven ball valve is provided in the main supply line between the tank and the boom. The valve means is operable to divert flow from the main supply line to a by-pass line so as to adjust the volume to the spray boom as may be required to achieve the application rate. A flow meter is provided to measure flow to the boom to enable the correct spray rate (usually measured in liters per hectare) to be achieved.

It is generally the case that a spray boom will have a plurality of set volume spray nozzles. After having determined nominal speed and application rate, the operator will select the necessary tip size. Generally, the nozzle tips are selected for optimum performance and therefore the tip size selected will be such that for the nominal speed and application rate the fluid flow through the nozzle tip will be at about midway in the performance range of the tip. Tip sizes are generally determined according to an international standard such as ISO 10625 or a national yet recognised standard such as BCPC.

Known spray control systems of this type are generally not suitable for spraying apparatus using 6, 12 or 24 volt DC pumps which are commonly used with eg smaller vehicles such as the now popular ATV. A flow meter is a high cost item as is the valving used to regulate the flow of spray fluid from the tank to the spray boom. This means that the system necessarily is of a cost greater than that which is justifiable for use with, for example, an ATV.

SUMMARY OF THE INVENTION

There is therefore a need for a low cost spray control system for use with vehicles such as an ATV yet is a system which at least includes the main features of bigger systems. The object of the present invention is to provide a low cost control device for spraying apparatus or at least provide the public with a useful choice.

According to one broad aspect of the invention, there is provided a spray control device for use with vehicle mountable spraying apparatus having a pump means for conveying fluid under pressure to a spray head, the control device including pressure sensing means for sensing the pressure of the fluid near the spray head, speed sensor means to enable calculation of vehicle speed, adjustment means for adjusting the delivery of fluid to the spray head and microprocessor means programmed to calculate from information derived from the pressure sensing means and speed sensor means a calculated spray application rate and compare same with a stored target application rate to thereby cause the adjustment means to, if necessary, adjust the pump means to deliver fluid so that a pressure is achieved such as to achieve the target application rate.

DESCRIPTION OF THE PREFERRED EMBODIMENTS

Figure 1:
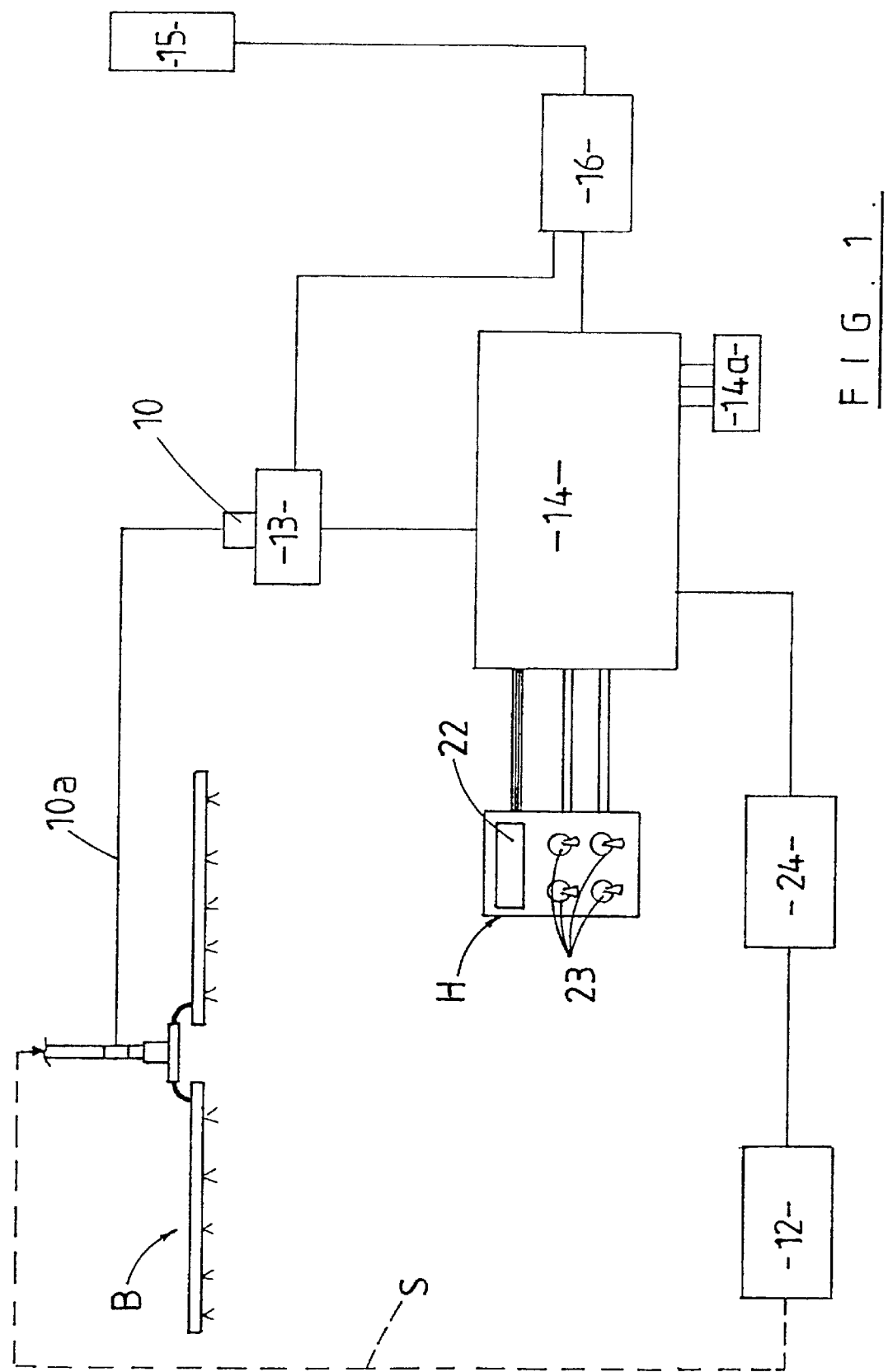
FIG. 1 is a schematic block diagram of the control device.

The spray control device according to the present invention is intended for use with sprayers which can be mounted directly to a vehicle such as an ATV or mounted on a vehicle to be trailed behind a vehicle such as an ATV. The control system according to the present invention is programmable so as to be adjustable for end user requirements and, in use, to provide a controlled application rate even though the speed of the vehicle may vary. While the invention is suitable for use with spraying apparatus having 6, 12 or 24 volt DC pumps commonly used with but not limited to a range of small vehicles or flat deck sprayers, the following description will, for convenience, refer to the vehicle as being an ATV.

A sprayer for such vehicles as an ATV will generally have a 6, 12 or 24 volt DC powered pump which is operable to pump fluid to be sprayed from a holding tank to a spray boom. Such sprayers are well known in the industry and to those skilled in the art therefore a detailed description is not required for the purposes of describing the present invention.

The spray control system according to the present invention includes a pressure transducer 10 which is coupled to the main supply lines from the pump 11 to the spray boom B. The spray boom will, as previously described, be of conventional construction and be provided with a plurality of spaced apart tips which for pressure nozzle sprayers will be tips according to ISO/DIS10625 (standard colours) and/or BCPC. The transducer 10 is coupled to a pressure sensing tube 10a which has its inlet end inserted into the main supply lines from the pump 11 and located as close as possible to the spray boom B.

The pressure transducer 10 is connected via a bridge circuit 13 to a microprocessor 14. The microprocessor 14 has an external memory (ROM) 14a. An example of the bridge circuit 13 appears in FIG. 2.

The bridge circuit 13 is coupled to the DC power supply 15 via a voltage regulator 16. Op amp 17 ensures a constant current power supply for the pressure transducer bridge 18. An offset null resistor array 19 is coupled as shown in FIG. 2 to the pressure transducer bridge 18.

The output from the pressure transducer bridge 18 is coupled to an instrumentation op amplifier 25 which is in turn coupled to a gain trim pot 20 for calibration purposes. A further op amp 21 is provided prior to the output to the microprocessor 14.

Figure 2:
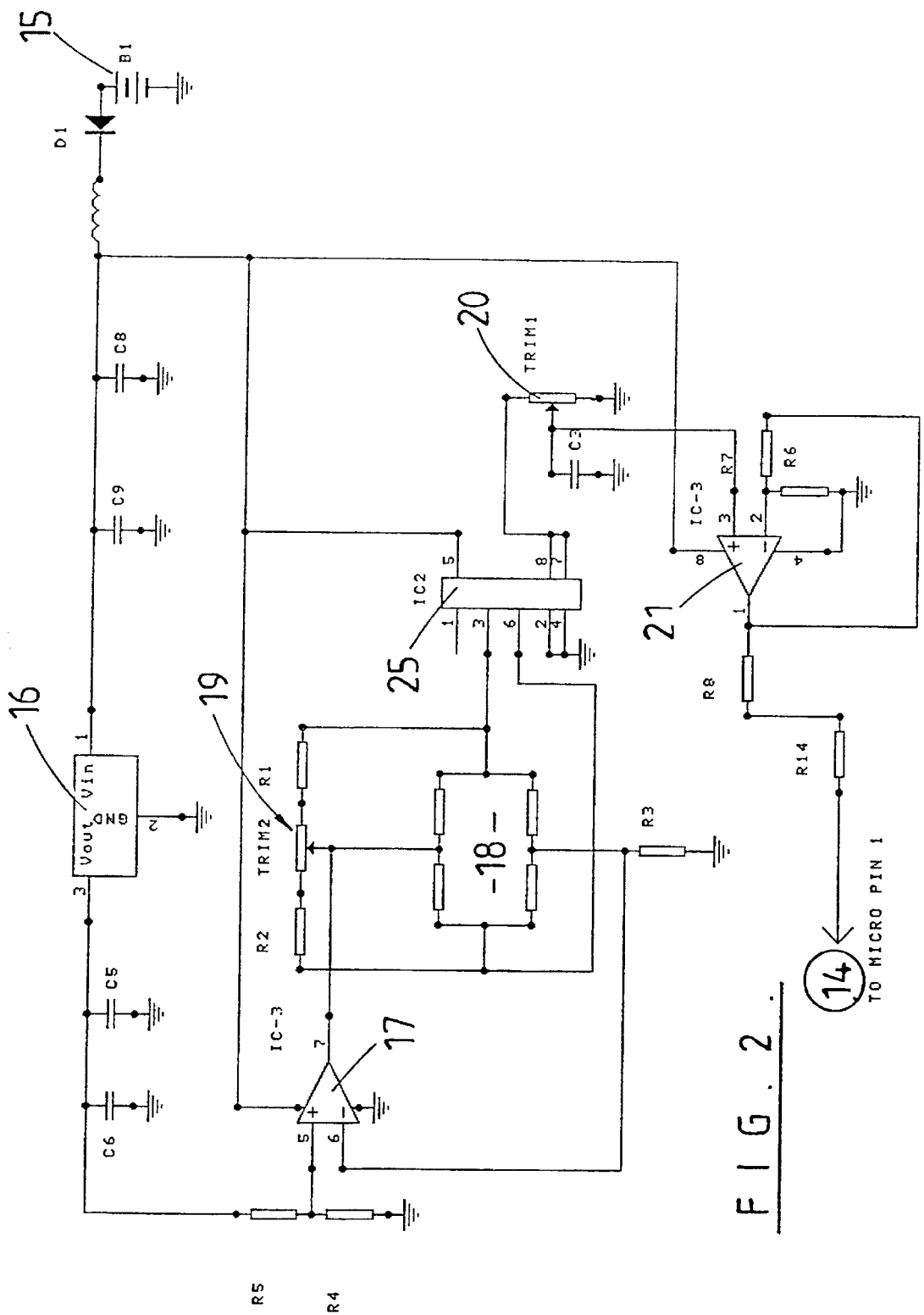
FIG. 2 is a circuit diagram of the bridge circuit incorporated in the device.
Figure 3:
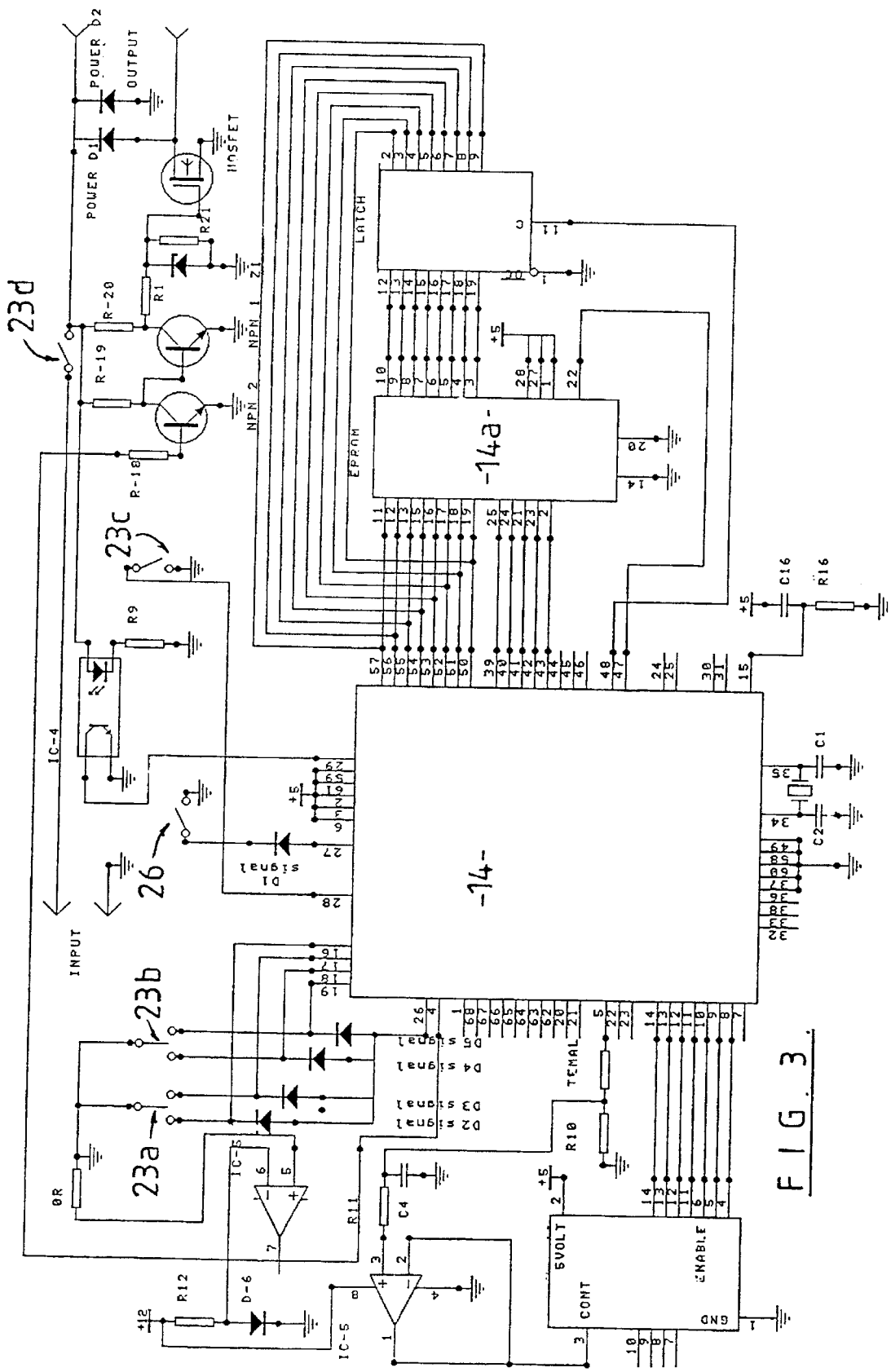
FIG. 3 is a circuit diagram of the control circuitry to which the bridge circuit is coupled.

The electronic circuitry, ie that of FIGS. 2 and 3 except for the speed sensor, is all located within a suitably configured housing H which is mountable at an appropriate place on the ATV, eg in the position where it is readily accessible and visible to the user of the ATV. The housing H includes a screen 22 in the form of a LCD which is coupled to the microprocessor 14. It will be appreciated that in FIG. 1 the electronic circuit and microprocessor 14 will be within housing H rather than as shown. A plurality of switches 23a–d are also provided with the housing and once again are coupled to the microprocessor 14.

The control device is completed by a pulse width modulator 24 coupled between the microprocessor 14 and the motor of pump 12. The pulse width modulator 24 controls the speed of the pump motor in response to signals from the microprocessor as will hereinafter be described.

The speed of the ATV is measured by a speed sensor (not shown). In the preferred form of the invention, the speed sensor includes a magnet or magnets which is/are, in use, attached to a wheel of the ATV and an associated reed switch 26 or Hall effect transistor mounted on the structure of the ATV and connected back to the housing H and into the clock within the microprocessor 14. In the preferred form of the invention the clock is a continuously operating 3600 hertz clock. Every time the magnet goes past the switch 26 the clock is stopped and by detecting how many stop pulses per unit of time the microprocessor can calculate the speed of the ATV.

In the preferred form of the invention, these pulses are incremented to provide a distance meter. The information can also be used to provide a speedometer function which is visibly displayable on screen 22 if required by the user. According to the software used in a preferred form of the invention, the distant increments are accumulated into a 10 meter distance block whereupon an interrupt signal enables the 10 meter block to be input to the main computer to thereby update the distance record in the computer.

The operation of the control system is as foreshadowed above computer controlled. Therefore, to further describe the invention reference will be made to the operation of the software controlled spray control system.

The spray control device according to the present invention derives a speed reading from the wheel sensor and a pressure signal from the pressure transducer 10. Using these readings, the spray control system adjusts the motor speed of the pump 12 to control the flow rate to the spray boom B. The range of flow adjustment is dependent on the tip size of the nozzles, the boom length and nozzle spacing, thus all of this information needs to be programmed into the microprocessor 14 by the ATV operator before spraying commences.

After power-up of the control device (using on-off switch 23d), the microprocessor 14 enters a data entry mode. This enables the wheel circumference, boom width, nozzle spacing, spray nozzle tip size and target application rate sub-modes to be entered by the operator.

One of the switches 23a ("the menu switch") operates as a menu switch so that the operator can step through the various data entry sub-modes. A second of the switches 23b ("the adjustment switch") enables the operator to increase or decrease the default reading which will be displayed for each sub-mode. When the correct figure has been reached by use of the adjustment switch 23b the operator simply steps to the next data entry sub-mode using the menu switch 23a.

The wheel circumference sub-mode enables the circumference of the wheel to which the speed sensor magnet has been fitted to be entered, this measurement being in centimeters. The boom width sub-mode is the effective width of the spray boom measured in centimeters and therefore provides a measure of the overall width of spray pattern from the boom B.

The nozzle space sub-mode enables the distance between nozzles measured in centimeters to be entered. The tip size sub-mode provides for entry of the size of the tips fitted to the boom using standard sizes as previously outlined.

The target rate sub-mode enables the operator to enter the application rate required, this being measured in liters per hectare.

All the data entry sub-mode settings are retained until the unit is disconnected from the power or the data entry sub-mode is re-entered and one or more of the settings changed.

The spray control device also provides a data display mode and can provide a display of distance travelled since power-up or since the display was last zeroed. The adjustment switch 23b is only active in the data display so as to zero the distance data. It can also zero an area data display. The distance data is displayed in meters and changes in 10 meter increments as previously discussed. This reading can be useful for measuring, say, the length of a fence, race or pasture. It therefore is not strictly necessary for the purposes of achieving spraying application rate though it could be used to measure dimensions of eg a pasture.

A spray rate data display provides the actual spray rate being applied measured in liters per hectare. This will generally be the same as that which has been entered in the data entry mode although there will be a slight lag when sudden changes in speed of the ATV are made.

A speed data display provides an indication of vehicle speed measured in kilometers per hour. This speed will change in 0.1 kilometer per hour increments because as discussed above in connection with distance data the speed readings are accumulated up to an 0.1 kph total. Upon an interrupt signal occurring the microprocessor is updated with the 0.1 kph increment.

The area data display provides a reading of the area sprayed since power-up or since the display was zeroed by the adjustment switch 23b. The area is measured in hectares and once again updated and displayed in 0.1 hectare increments.

Finally, a pressure data display is obtainable. This provides spraying pressure at the spray boom measured in Bar. The pressure will change in 0.1 Bar increments.

A further control switch 23c ("mode switch") provides for either automatic or manual mode of operation of the device. When in automatic mode the RPM of the motor of the spray pump will be automatically adjusted to ensure that the target application rate is maintained. In the event that the speed of the ATV is too fast or the pump volume is too low to maintain the target application rate, the display 22 will display "Out of Range" until the target application rate is achieved.

The fourth of the switches 23d on the housing is an on/off switch which enables spraying to be ceased at the end of a row or pasture. The spray pump 12 is thus switched off using the on/off switch. When this happens the distance and area cease to be computed until such time as the on/off switch 23d is turned on.

When in the manual mode, the display screen 22 will generally be set to show pressure so that the operator can manually alter the speed of the spray pump using the adjustment switch 23b to thereby control the spraying pressure to that which is required.

The operating programme of the microprocessor 14 is essentially a continuous loop. It carries out a continuous testing regime to determine whether, during a predetermined length of time (preferably 5 seconds), the actual application rate equals the target rate. If during the 5 second length of time a match of application rate to target rate is achieved, then a new 5 second time period is established.

Every one-eighteenth of a second, the microprocessor 14 carries out an analogue to digital conversion of the pressure signal and looks to see what tip size has been entered by the operator. The microprocessor then goes to look up tables which provide data relative to the tip size and thereby determines pressure and speed data for a particular application rate.

The microprocessor converts the actual speed of the ATV, the actual pressure at the time as sensed by the pressure transducer 10 and nozzle spacing to arrive at a liters per hectare reading and then compares this to the target rate. If the calculated rate is different to the target rate the microprocessor attempts to compensate by adjusting the pump motor through control of the pulse width modulator 24. The pulse width modulator 24 will, however, in practice only change the speed of the pump 12 in increments, hence it may involve a number of adjustments before the actual calculated rate equals the target rate. As a consequence of the continuous loop programme, the control system will consider that the target rate is being met provided that during the aforesaid five second length of time there is at least one match of calculated rate to target rate.

The present invention thus provides a low cost control system which relies on adjustment of the pump speed to achieve the required application rate. The system, therefore, does not rely on expensive flow meter and valve means yet, nevertheless, provides features normally only associated with bigger systems. Consequently, the control system is particularly suited for applications on smaller vehicles and small booms such as those which are now commonly associated with ATVs and only small vehicles/trailers.

What is claimed is:

1. A spray control device for use with vehicle mountable spraying apparatus having a pump for conveying fluid under pressure to a spray head, the control device including a pressure sensor for sensing the pressure of the fluid near the spray head, a speed sensor to enable calculation of vehicle speed, an adjustment control for adjusting the delivery of fluid to the spray head and a microprocessor programmed to calculate, from information derived from the pressure sensor and speed sensor, a calculated spray application rate and compare the calculated spray application rate with a stored target application rate to thereby cause the adjustment control to, if necessary, adjust the pump to deliver fluid so that a pressure is achieved such as to achieve the target application rate.

2. A control device as claimed in claim 1, wherein the pressure sensor is a pressure transducer.

3. A control device as claimed in claim 1, wherein pressure sensor is coupled to a sensing conduit adapted to connect into a main supply line from the pump.

4. A control device as claimed in claim 2, wherein the pressure transducer is coupled to a sensing conduit adapted to connect into a main supply line from the pump.

5. A control device as claimed in claim 2, wherein the pressure transducer is connected via a bridge circuit to a microprocessor.

6. A control device as claimed in claim 5, wherein the microprocessor includes an external memory.

7. A control device as claimed in claim 1, further including a visual display unit.

8. A control device as claimed in claim 1, wherein the speed sensor includes one or more magnets, in use attached to a wheel of the vehicle, and a switch.

9. A control device as claimed in claim 8, wherein the speed sensor is coupled to a clock in the microprocessor.

10. A control device as claimed in claim 9, wherein the clock is a continuously operating clock which is stopped at each passing of the switch or a magnet by the switch, the microprocessor determining pulses per unit time to calculate speed.

11. A control device as claimed in claim 1, wherein the microprocessor is programmed to receive input of effective width of a spray boom, nozzle spacing and nozzle tip size and a target application rate, said microprocessor being further programmed to compare actual application rate to the target application rate whereby the microprocessor adjusts as necessary the pump.

12. A control device as claimed in claim 1, wherein the adjustment control is a pulse width modulator coupled between the microprocessor and a motor of the pump.

13. The device of claim 1, wherein the adjustment control adjusts a speed of the pump to deliver fluid so that the pressure is achieved to achieve the target application rate.

14. A spray control device, comprising:

a pump;

a spray boom;

a main supply line extending from the pump to the spray boom;

a pressure sensing tube with an inlet connected to the main supply line at a line adjacent the spray boom;

a pressure transducer coupled to the pressure sensing tube to sense pressure at the spray boom;

a microprocessor connected to the pressure transducer; and a pulse width modulator connected intermediate the microprocessor and the pump, the pulse width modulator controlling the pump based on control signals from the microprocessor, wherein, the microprocessor compares the pressure sensed at the spray boom to determine a calculated spray application rate, the microprocessor compares the calculated spray application rate to a stored, non-zero spray application rate, and the microprocessor directs the pulse width modulator to adjust a speed of the pump to deliver fluid to provide a spray head pressure corresponding to the stored spray application rate.

15. The device of claim 14, wherein the pump is a 12 volt DC pump.

16. The device of claim 14, further comprising:

mountings to mount the device on a vehicle.

17. The device of claim 14 in combination with a trailer unit, the device being mounted on the trailer unit, the trailer unit being towable by a vehicle.

18. The device of claim 14, wherein the pump is a DC pump.

19. A spray control device, comprising:

a pump;

a spray boom;

a main supply line extending from the pump to the spray boom;

a pressure transducer coupled to sense pressure at the spray boom; and a microprocessor connected to the pressure transducer, wherein, the microprocessor compares the pressure sensed at the spray boom to determine a calculated spray application rate, the microprocessor compares the calculated spray application rate to a desired spray application rate, and the microprocessor directs a speed of the pump to deliver fluid to provide a spray head pressure corresponding to the desired, non-zero spray application rate.

20. The device of claim 19, wherein, the pump is a DC pump, and the device is portable by mounting to or towing by a vehicle.

21. The device of claim 19, wherein the microprocessor does not control any control valve that controls fluid flow so as to achieve the desired, non-zero spray application rate.

\* \* \* \* \*